(12) United States Patent
Buttress

(10) Patent No.: US 8,841,573 B2
(45) Date of Patent: Sep. 23, 2014

(54) APPARATUS FOR FIELD WELDING SOLAR RECEIVER TUBES

(76) Inventor: David Buttress, San Jose, CA (US)

( * ) Notice: Subject to any disclaimer, the term of this patent is extended or adjusted under 35 U.S.C. 154(b) by 326 days.

(21) Appl. No.: 12/870,050

(22) Filed: Aug. 27, 2010

(65) Prior Publication Data

US 2011/0049106 A1 Mar. 3, 2011

Related U.S. Application Data

(60) Provisional application No. 61/238,195, filed on Aug. 30, 2009.

(51) Int. Cl.
*B23K 31/02* (2006.01)

(52) U.S. Cl.
USPC .......................................................... 219/67

(58) Field of Classification Search
CPC ............. B23K 37/0533; B23K 9/0286; B23K 2201/06; B23K 2201/10; B23K 26/285
USPC .............. 219/59.1, 67, 50, 76.17, 60 A, 60 R, 219/61.3, 61.4; 228/44.3, 212; 29/890.033, 29/890.054
See application file for complete search history.

(56) References Cited

U.S. PATENT DOCUMENTS

| | | | |
|---|---|---|---|
| 3,702,913 A | 11/1972 | Kazluaskas et al. | |
| 3,702,915 A | 11/1972 | Vilkas et al. | |
| 3,728,515 A | 4/1973 | Gedgaudas | |
| 3,777,115 A | 12/1973 | Kazluaskas et al. | |
| 3,835,286 A | 9/1974 | Kazluaskas | |
| 3,842,922 A | 10/1974 | Fagin et al. | |
| 4,373,125 A | 2/1983 | Kazluaskas | |
| 4,439,664 A | 3/1984 | Toohey | |
| 4,439,665 A | 3/1984 | Arter | |
| 4,511,785 A | 4/1985 | Arter et al. | |
| 4,699,082 A | 10/1987 | Hakim | |
| 4,803,127 A | 2/1989 | Hakim | |
| 4,922,073 A | 5/1990 | Weir | |
| 5,058,818 A | 10/1991 | Haehnel et al. | |
| 5,139,824 A | 8/1992 | Liburdi et al. | |
| 5,156,321 A | 10/1992 | Liburdi et al. | |
| 5,255,088 A | 10/1993 | Thompson | |
| 5,292,594 A | 3/1994 | Liburdi et al. | |
| 5,368,748 A | 11/1994 | Sanderson | |
| 5,534,156 A | 7/1996 | Sanderson | |
| 5,562,257 A | 10/1996 | Graveman et al. | |
| 5,598,199 A | 1/1997 | Mielke | |
| 5,628,467 A | 5/1997 | Graveman | |
| 5,655,699 A | 8/1997 | McGushion | |

(Continued)

FOREIGN PATENT DOCUMENTS

| | | |
|---|---|---|
| JP | 2008-023592 A | 2/2008 |
| KR | 10-2003-0017022 A | 3/2003 |
| KR | 10-2008-0001821 A | 1/2008 |

OTHER PUBLICATIONS

International Search Report PCT/US2010/046925, May 24, 2011.

*Primary Examiner* — Duy T Nguyen
(74) *Attorney, Agent, or Firm* — Steven R. Vosen

(57) ABSTRACT

Apparatus and methods for assembling solar receiving tubes in the field are described. In one embodiment, a welder is provided having longitudinally adjustable clamps that permit the easy restraining and adjustment of tube position for welding. In another embodiment, a system for moving along the length of a solar collector and sequentially welding tubes is described.

25 Claims, 17 Drawing Sheets

(56) References Cited

U.S. PATENT DOCUMENTS

| | | |
|---|---|---|
| 5,775,195 A | 7/1998 | Haehnel et al. |
| 5,810,962 A | 9/1998 | Annenkov et al. |
| 5,824,983 A | 10/1998 | Huddleston, Jr. |
| 5,837,966 A | 11/1998 | Timmons, Jr. |
| 5,841,089 A | 11/1998 | Martinenas |
| 6,093,287 A | 7/2000 | Sanderson |
| 6,209,307 B1 | 4/2001 | Hartman |
| 6,244,189 B1 | 6/2001 | Kingsley |
| 6,325,277 B1 * | 12/2001 | Collie ............ 228/212 |
| 6,351,696 B1 * | 2/2002 | Krasny et al. ............ 701/50 |
| 6,527,216 B2 | 3/2003 | Eagelman et al. |
| 6,624,225 B1 | 9/2003 | Ellison et al. |
| 6,660,643 B1 | 12/2003 | Kardauskas et al. |
| 6,660,930 B1 | 12/2003 | Gonsiorawski |
| 6,668,820 B2 | 12/2003 | Cohen et al. |
| 6,705,311 B1 | 3/2004 | Schwartzman et al. |
| 6,727,459 B1 | 4/2004 | Bialach |
| 6,740,158 B2 | 5/2004 | Piwczyk |
| 6,746,709 B2 | 6/2004 | Lauinger et al. |
| 6,797,759 B1 | 9/2004 | Ellison et al. |
| 6,805,906 B2 | 10/2004 | Moravek et al. |
| 6,815,246 B2 | 11/2004 | Gonsiorawski et al. |
| 6,832,608 B2 | 12/2004 | Barkai et al. |
| 6,849,842 B2 | 2/2005 | Little |
| 7,115,679 B2 | 10/2006 | Ellison et al. |
| 7,135,069 B2 | 11/2006 | Piwczyk |
| 7,199,174 B2 | 4/2007 | Ellison et al. |
| 7,253,355 B2 | 8/2007 | Schwirtlich et al. |
| 7,412,976 B2 | 8/2008 | Winston |
| 7,435,897 B2 | 10/2008 | Russell |
| 7,780,065 B2 * | 8/2010 | Vermaat ............ 228/212 |
| 2004/0016865 A1 | 1/2004 | Little |
| 2004/0161872 A1 | 8/2004 | Gonsiorawski et al. |
| 2004/0168625 A1 | 9/2004 | Piwczyk |
| 2004/0261788 A1 | 12/2004 | Winston |
| 2005/0115176 A1 | 6/2005 | Russell |
| 2005/0247686 A1 * | 11/2005 | Child ............ 219/124.34 |
| 2006/0053706 A1 | 3/2006 | Russell |
| 2007/0048884 A1 | 3/2007 | Nagel |
| 2007/0119829 A1 | 5/2007 | Vietz et al. |
| 2007/0184560 A1 | 8/2007 | Schwirtlich et al. |
| 2008/0053367 A1 | 3/2008 | Seidl et al. |
| 2008/0061487 A1 * | 3/2008 | Falk ............ 269/52 |
| 2008/0127647 A1 | 6/2008 | Leitner |
| 2008/0152568 A1 | 6/2008 | Seidl et al. |
| 2008/0271731 A1 | 11/2008 | Winston |
| 2008/0302314 A1 | 12/2008 | Gonzalez et al. |
| 2008/0308892 A1 | 12/2008 | Wildpanner et al. |
| 2009/0056703 A1 | 3/2009 | Mills et al. |
| 2010/0313877 A1 * | 12/2010 | Bellman et al. ............ 126/653 |

* cited by examiner

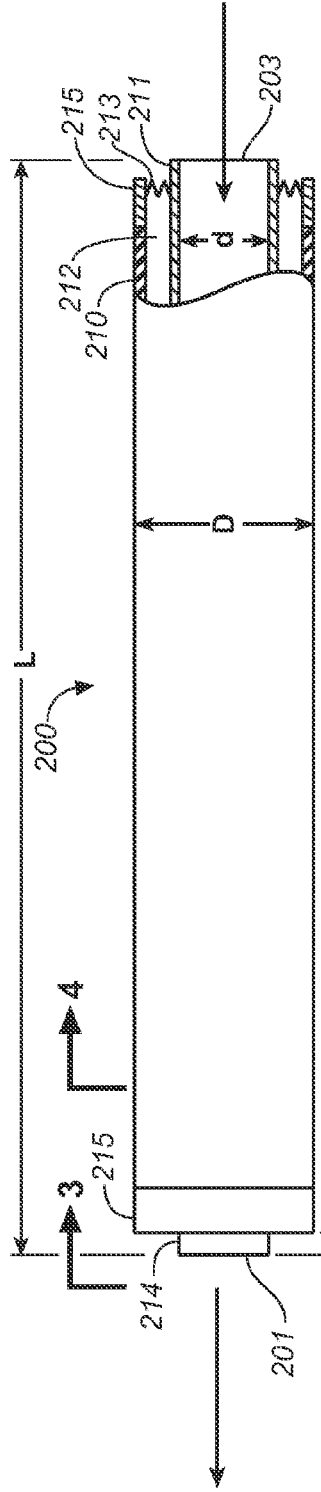
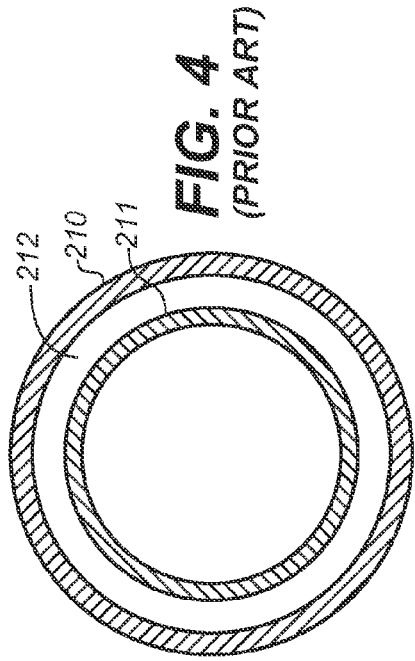
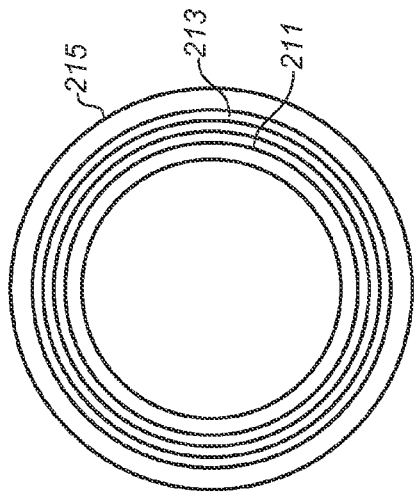
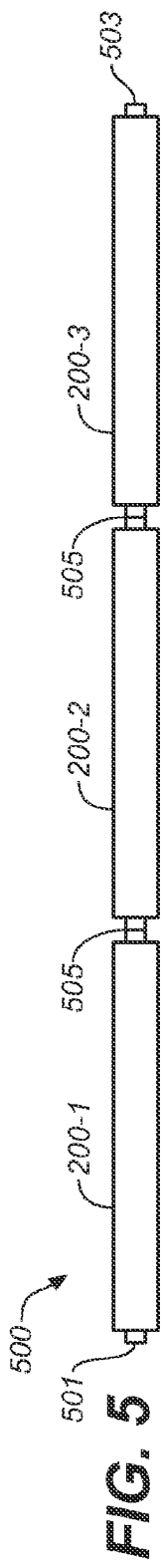
FIG. 2 (PRIOR ART)
FIG. 3 (PRIOR ART)
FIG. 4 (PRIOR ART)
FIG. 5

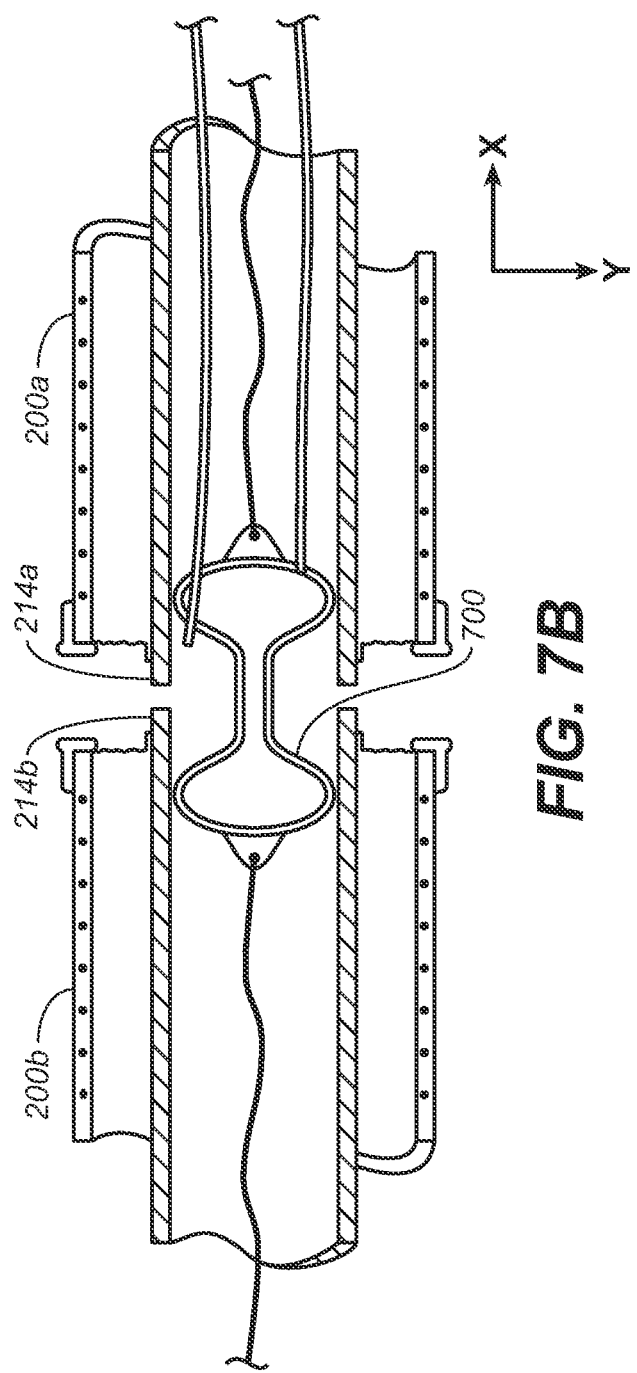

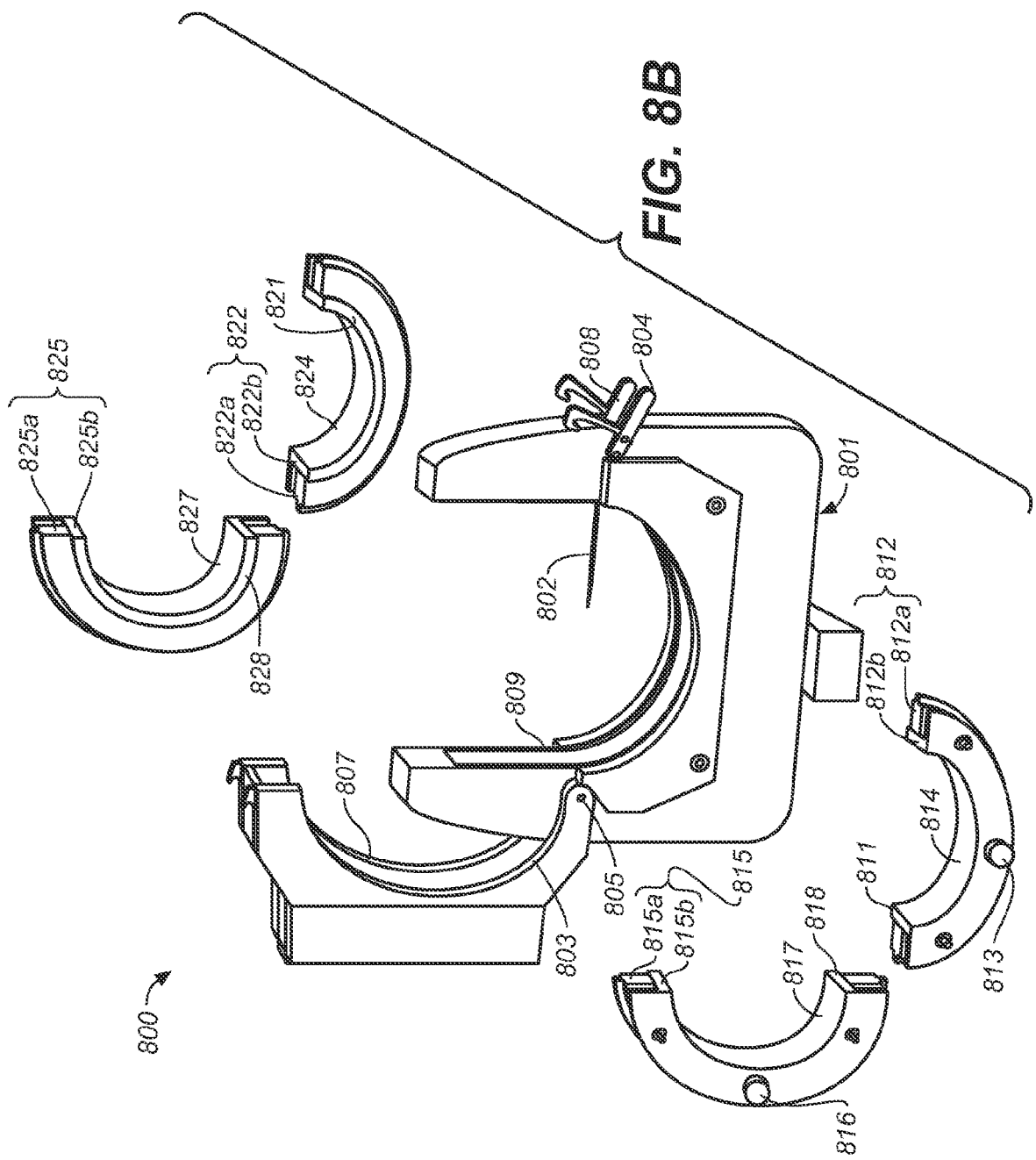

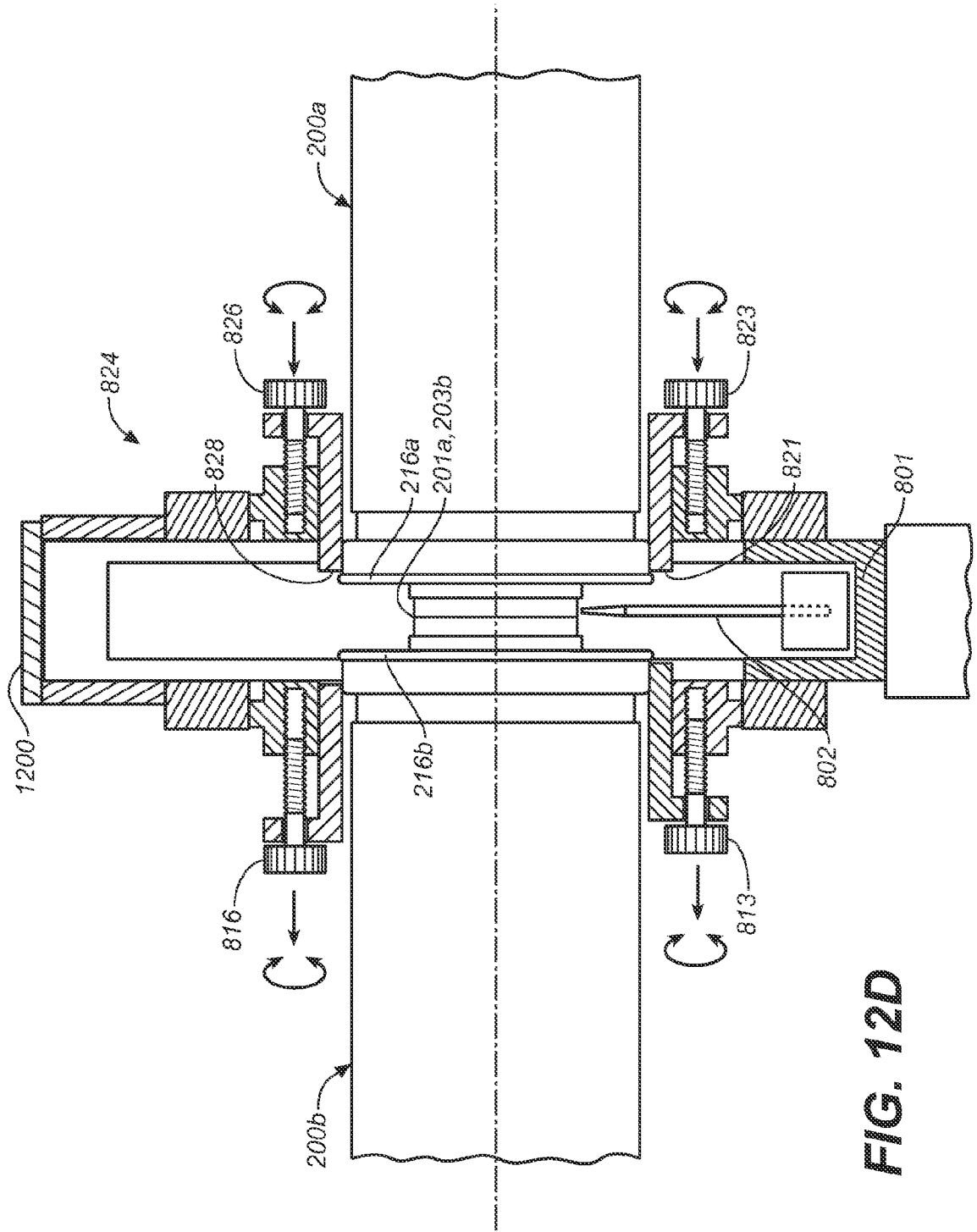

APPARATUS FOR FIELD WELDING SOLAR RECEIVER TUBES

CROSS-REFERENCE TO RELATED APPLICATIONS

This application claims the benefit of priority under 35 U.S.C. 119(e) to U.S. Provisional Application No. 61/238,195 filed Aug. 30, 2009, which is incorporated by reference in its entirety.

BACKGROUND OF THE INVENTION

1. Field of the Invention

The present invention generally relates to apparatus and methods for assembling pipes, and more particularly to methods and systems for joining tubes for solar receivers.

2. Discussion of the Background

Solar thermal power plants may be used to obtain electric power from the sun. In such plants, the solar flux impinges on tubes through which a heat exchange medium flows. In some solar thermal power plants, tubes are situated in a solar collector, such as along the axis of a parabolic trough. The heated heat exchange medium from the tubes may be used in a thermodynamic cycle to generate electric power.

FIG. 1A is a perspective view of a portion of a typical prior art concentrating solar power plant 100 comprising one or more solar energy collectors 110 arranged in a field. Each collector 110 includes one or more trough-shaped structures 113 having a reflective surface 119, two or more ground supports 111, an absorber tube 115 that extends the length of the collector, and tube supports 117 that couple the reflector to the absorber tube. It is not uncommon for each collector 110 to have a length A of approximately 380 feet (116 meters), a width B of approximately 20 feet (6 meters), and a height off the ground H greater than 10 feet (3 meters).

Typically, surfaces 119 have a longitudinal axis along length A and a parabolic shape in a plane perpendicular to the longitudinal axis, and absorber tube 115 is supported along the axis, such that light normally impinging on the reflector is focused (or concentrated) on the absorber tube. A mechanism (not shown) is provided to so rotate reflective surface 119 during the day to direct incident sunlight on absorber tube 115 and thus optimize the collection of solar energy on the tube.

Absorber tube 115 is generally hollow to permit the flow of a heat transfer medium, such as water, salt, or some other liquid or gas, along the absorber tube, thus collecting the concentrated solar energy. The exiting heat transfer medium may then, for example, be used to drive a turbine or heat engine (not shown) to generate electricity.

The construction of certain solar power plants 100 generally involves the following steps: 1) placing ground supports 111 in the field, 2) attaching trough-shaped structures 113 to the ground supports, and 3) joining absorber tube 115 to tube supports 117. To facilitate construction, absorber tube 115 may be formed by joining many smaller tubes that are joined together. The smaller tubes are sometimes referred to as "solar receiver tubes" or "heat collection elements (HCE)."

FIG. 2 is a partial sectional side view of a prior art HCE 200, FIG. 3 is an end view of the HCE, and FIG. 4 is a sectional end view of the HCE. HCE 200 may be, for example and without limitation, a SCHOTT solar receiver tube model PTR 70 (SCHOTT Solar, Inc., Albuquerque N. Mex.).

Typically, HCE 200 includes an outer tube 210 having a diameter D that is capped at each end by a metal flange 215, an inner tube 211 and that is coaxial with the outer tube, and a metal bellows 213 that connects the flange and inner tube. Tube 210 is preferably optically transparent and is made, for example of a glass. Flange 215 is attached to a bellows 213 that extends to tube 211. Tube 211 is thermally conductive, and may be formed from a metal, and has a length L and an inner diameter d, through which a heat transfer medium may flow. Tube 210 is generally transparent to sunlight to facilitate the solar heating of a heat exchange medium that may flow through glass tube 211, as indicated by arrows in FIG. 2. Tubes 210 and 211, bellows 213 and flange 215 are sealed to form a volume 212, which is evacuated to provide a high thermal insulation between tubes 210 and 211.

In general, the length L is from 5 feet (1.5 m) to 20 feet (6 m), the diameter D is from 2 inches (50 mm) to 7 inches (0.18 m), and the diameter d is from 1 inch (25 mm) to 4 inches (0.1 m).

For certain HCEs 200, tube 211 protrudes longitudinally beyond the end of each flange 215 by a distance S, which it typically from 0.375 inches (10 mm) to 4 inches (0.1 m). The portion of tube 211 that so protrudes is referred to as a collar 214. Forming an absorber tube 115 requires joining collars 214 of adjacent absorber tubes. In certain other HCEs 200, the free ends of flange 215 may also have a radial protrusion at the end.

FIG. 1B is a perspective view illustrating details of a prior art solar energy collector 110. Absorber tube 115 is formed from a plurality of HCEs 200, denoted 200a, 200b, and 200c. The ends of each pair of HCEs are support by one tube support 117.

One method for joining HCEs 200 is by orbital welding. One example of such a welder system is an Arc Machines model 207 power supply controller (Arc Machines, Inc., Pacoima, Calif.) with its mating 207-CW cooling package may be used with an Arc Machine 9-7500 welder.

Due their length, L, and glass components, solar receiver tubes tend to be fragile, and difficult to join, typically by welding, since the collars 214 protrude beyond the ends of the glass outer tube 210 by a relatively small distance from each end. Further, collars 214 are adjacent to bellows 213, on whose integrity the vacuum of volume 212 depends. In addition, the height C may make it very difficult to place and manipulate a welder. Solar receiver tube are thus difficult to join, especially in the field, without damaging the more fragile glass outer tube 210 or the bellows 213 joining tubes 210 and 211. There is a need in the art for methods and apparatus that permit the easy and rapid joining of such tubes to facilitate more efficient assembly of solar energy systems.

BRIEF SUMMARY OF THE INVENTION

In certain embodiments, an apparatus for welding the ends of a first and a second HCE is provided, where each HCE includes an outer collar and a concentric and inner tube. The apparatus includes: a first mechanism for accepting the first outer collar; a second mechanism for accepting the second outer collar; and a weld head. The first mechanism and second mechanism are attached to the weld head, and where at least one of the first mechanism and the second mechanism is adjustable to translate the accepted HCE in a longitudinal HCE direction.

In certain other embodiments, an apparatus for welding the ends of a first and a second HCE using a weld head is provided, where each HCE includes an outer collar and a concentric and inner tube. The apparatus includes: a first mechanism for accepting the first outer collar and adapted for attachment to the weld head; and a second mechanism for accepting the second outer collar and adapted for attachment to the weld head. When the first mechanism and the second mechanism are attached to the weld head, at least one of the first mechanism and the second mechanism is adjustable to translate the accepted HCE in a longitudinal HCE direction.

In certain embodiments, an apparatus for welding the ends of a first and a second HCE is provided. Each HCE includes an outer collar and a concentric and inner tube. The apparatus includes a weld head, a first means for clamping the first collar and longitudinally positioning the ends of an accepted first HCE; and a second means for clamping the second collar and longitudinally positioning the ends of an accepted second HCE. The first and second means permit locating the ends of the first HCE and second HCE for welding by the weld head.

In yet certain other embodiments, an apparatus for welding the ends of a first and a second HCE in a solar energy system at a height above the ground is provided, where each HCE includes an outer collar and a concentric and inner tube. The apparatus includes: a vehicle having a weld head, a welding power supply, and a platform to enable a user to reach the HCEs for welding.

In certain embodiments, a method of assembling a solar energy system is provided, where the solar energy system includes an absorber tube formed from a plurality of joined HCEs. The method includes: placing the plurality of HCEs in the solar energy system; moving a vehicle having a weld head, a welding power supply, and a platform to enable a user to reach the HCEs along the HCEs; and welding adjacent HCEs.

These features together with the various ancillary provisions and features which will become apparent to those skilled in the art from the following detailed description, are attained by the tube joining apparatus and method of the present invention, preferred embodiments thereof being shown with reference to the accompanying drawings, by way of example only, wherein:

BRIEF DESCRIPTION OF THE SEVERAL VIEWS OF THE DRAWING

FIG. 2 is a partial sectional side view of a prior art heat collection element (HCE);

FIG. 3 is an end view of 2-2 of FIG. 2;

FIG. 4 is a sectional end view 3-3 of FIG. 2;

FIG. 5 is side view of a triple-joined HCE;

FIG. 7B is a cross-sectional view of HCEs near a weld location, illustrating the use of a traveling purge dam to isolate the region being welded;

FIG. 8B is an exploded perspective view of an embodiment of a joining apparatus;

FIGS. 12A, 12B, 12C, and 12D, which are sequential sectional side views 12-12 from FIG. 11 illustrating one embodiment of a method of joining HCEs.

Reference symbols are used in the Figures to indicate certain components, aspects or features shown therein, with reference symbols common to more than one Figure indicating like components, aspects or features shown therein.

DETAILED DESCRIPTION OF THE INVENTION

Figure 1A:
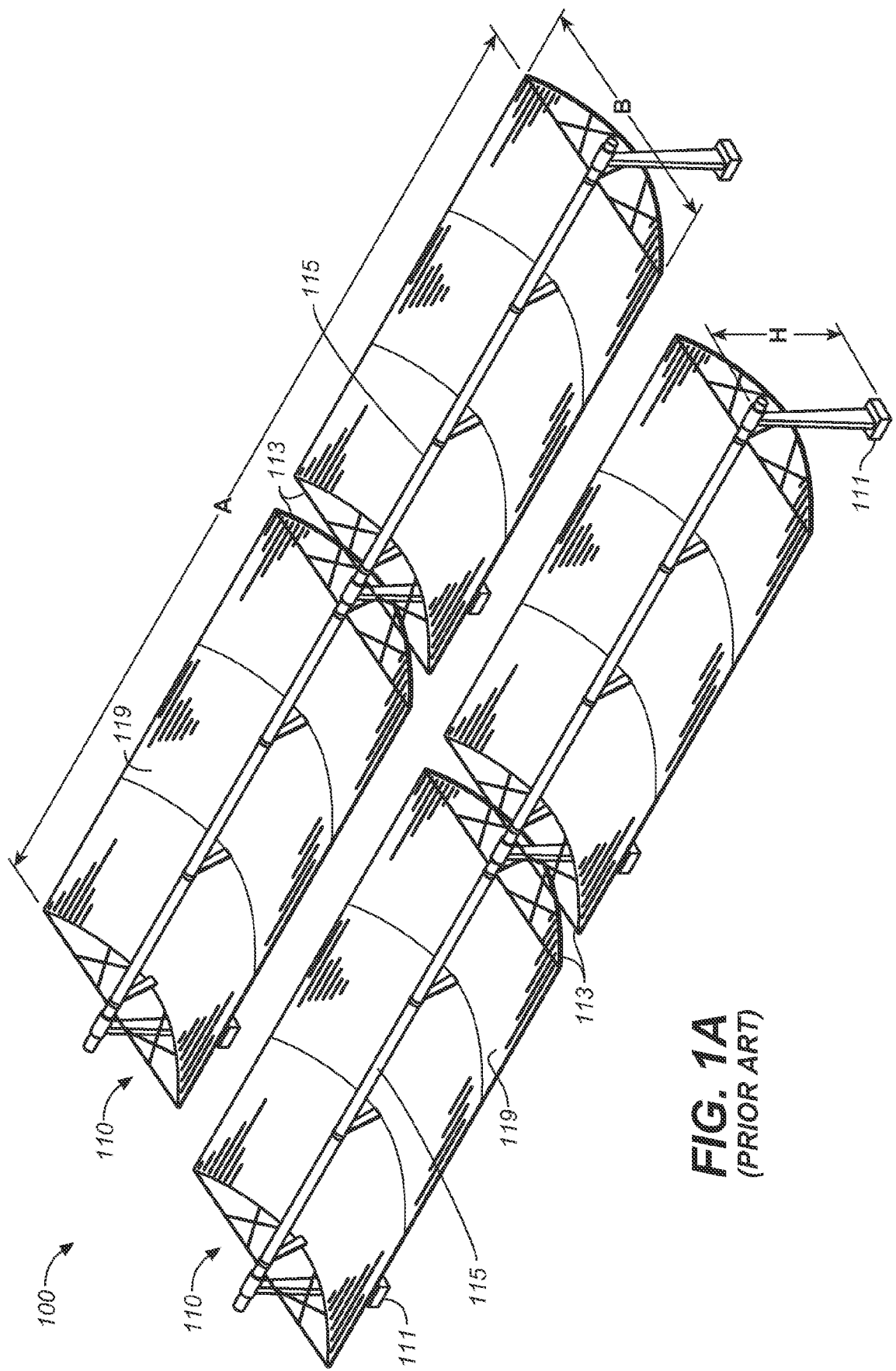
FIG. 1A is a perspective view of a portion of a typical prior art concentrating solar power plant.
Figure 1B:
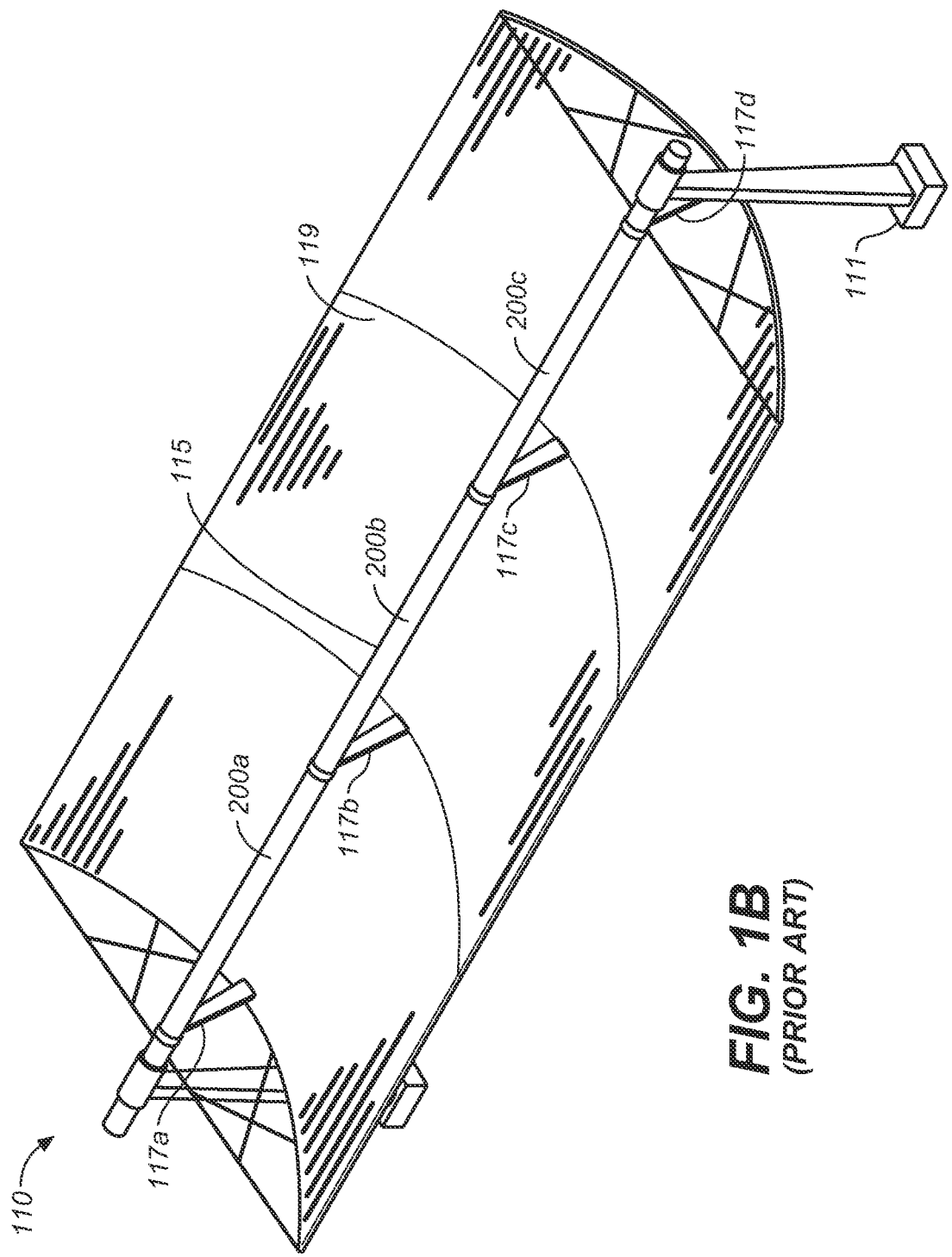
FIG. 1B is a perspective view illustrating details of a prior art solar energy collector.
Figure 6A:
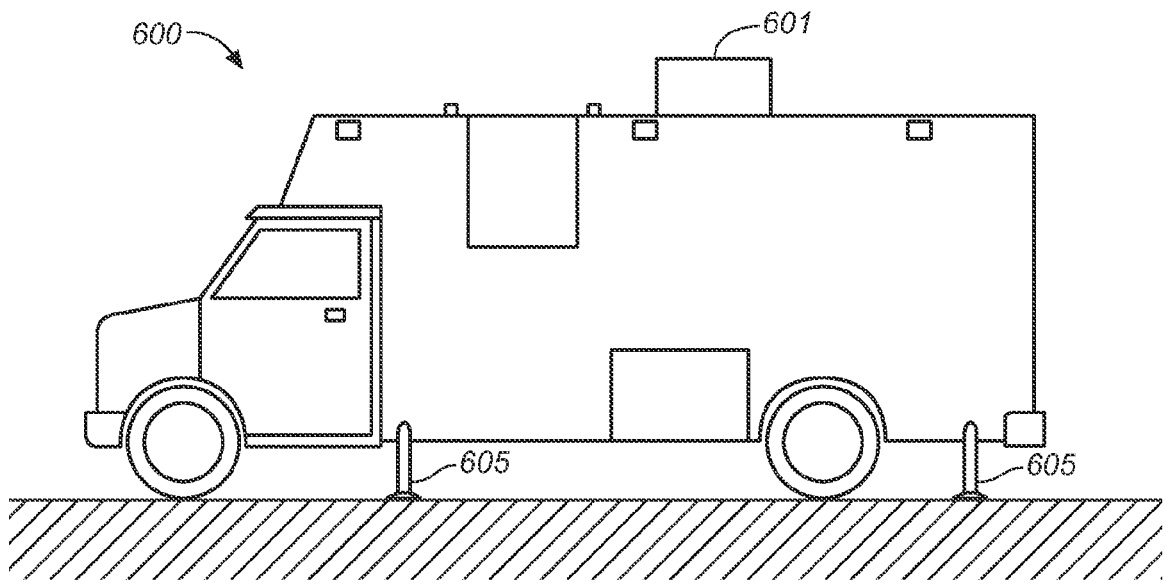
FIG. 6A is a side view of a field welding vehicle.
Figure 6B:
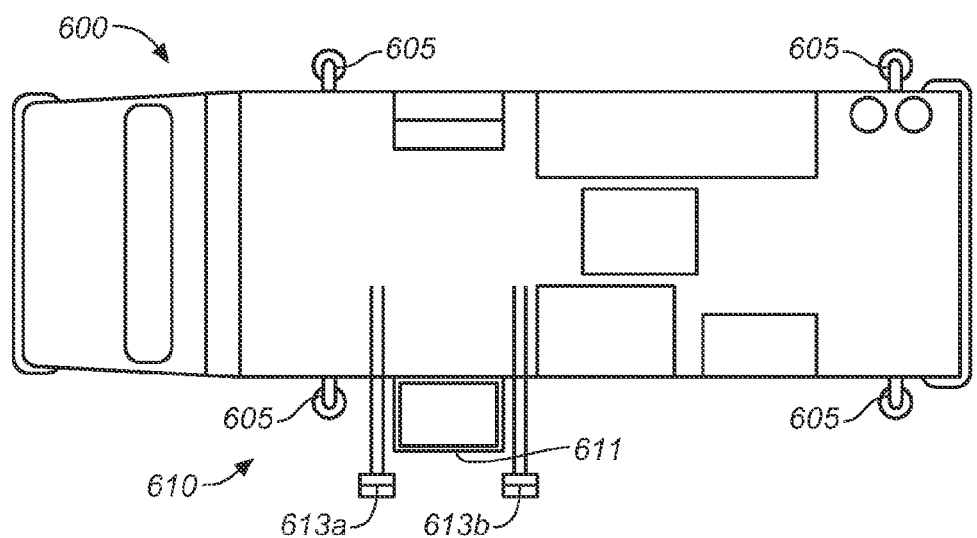
FIG. 6B is a top view of the field welding vehicle of FIG. 6A.
Figure 7A:
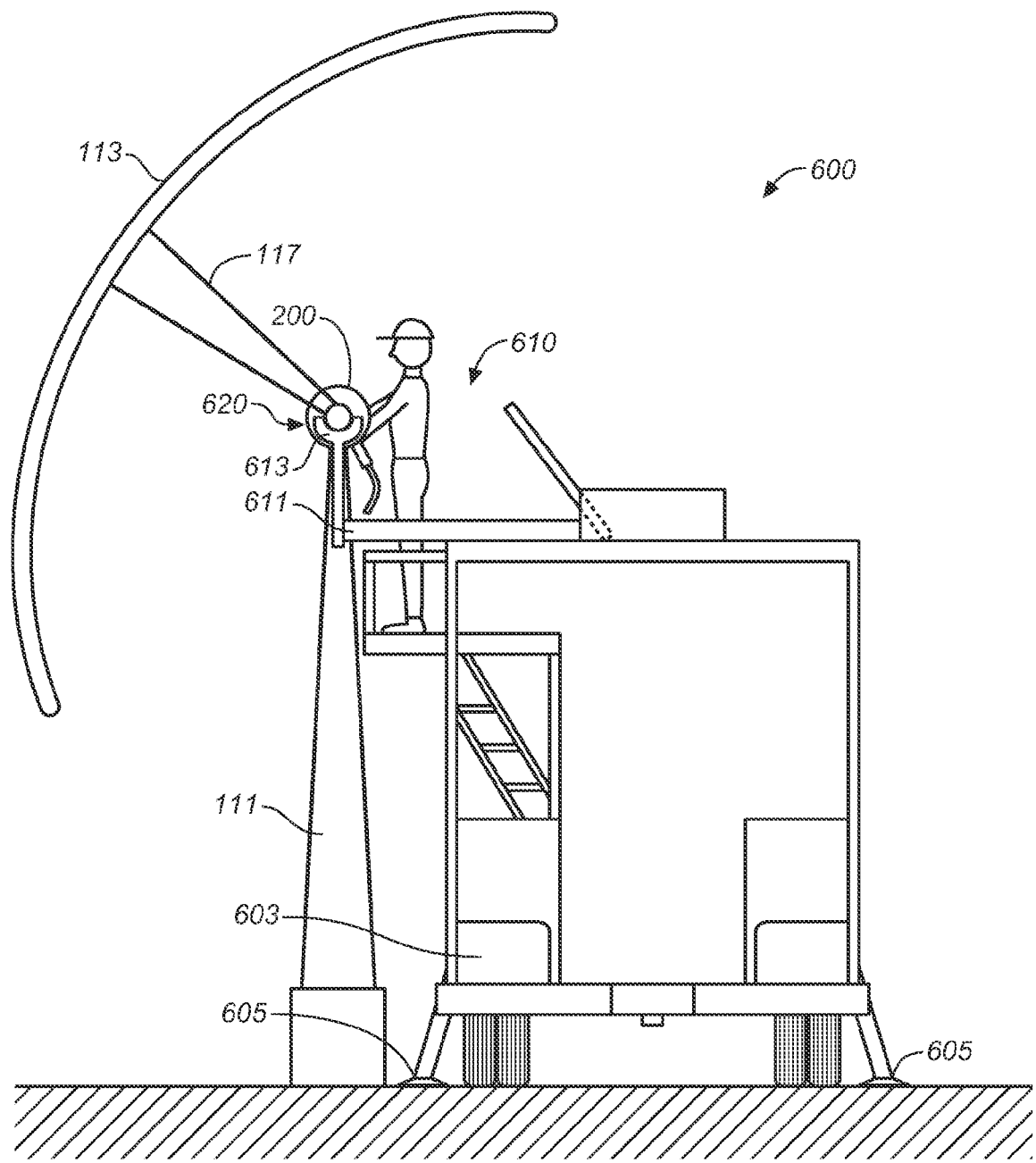
FIG. 7A is a view of the back of the vehicle of FIG. 6A during a welding operation.

In general, embodiments are provided that permit the field welding of tubes (HCEs) to form absorber tubes of solar energy systems. One embodiment of an apparatus for field welding tubes is illustrated in FIGS. 6A, 6B, and 7A, where FIG. 6A is a side view of a field welding vehicle 600, FIG. 6B is a top view of the field welding vehicle, and FIG. 7A is a view of the back of the vehicle during a welding operation. Field welding vehicle 600 may be used, for example and without limitation to field weld a plurality of HCEs 200 to form an absorber tube 115.

Field welding vehicle 600 includes and/or may supply all of the electricity and gases needed to operate welder 620. Vehicle 600 may be, for example and without limitation a modified vehicle such as a cargo van or box truck. Thus, for example and without limitation, field welding vehicle 600 may include, but it not limited to, one or all of the following: a roof air-conditioning 601 for environmental control; a generator 603 within the vehicle for onboard operations; automatic self-leveling outriggers 605 to stabilize vehicle in work mode; and a slide out work platform 610.

Platform 610 may include one or more of the following: a safety railing 611, a safety rigging belt; a weld head holder bracket for welder 620; and auxiliary lighting for night work. Platform 610 may also include support arms 613a and 613b for alignment and support of adjacent HCEs 200 relative to welder 620 during welding, and power actuation of support arm, by electric, pneumatic, hydraulic means.

Prior to welding, the HCEs 200 for collector 110 are placed and secured by tube supports 117 in the approximate location where they will reside as absorber tube 115. Thus, for example and without limitation, HCEs 200 are positioned in tube supports 117. Structure 113 is rotated to a service position to provide access to HCEs 200, as illustrated in FIG. 7A.

Alternatively, several HCEs 200 may be joined prior to being placed in collector 110. Thus, two or more tubes may be pre-joined, as illustrated, without limitation in FIG. 5 as a side view of a triple-joined HCE 500 in FIG. 5, having an end 501 and an end 503. HCE 500 is formed by welding three HCE 200 (200-1, 200-2, and 200-3). Specifically, welds 505 are formed at end 203 of HCE 200-1 and end 201 of HCE 200-2, and at end 203 of HCEs 200-2 and end 203 of HCE 200-3. In general, the procedure for welding HCE 200 and 500 into collector 110 are the same.

Vehicle 600, as shown in FIG. 7A, preferably starts at one end of collector 110, joins collars 214 of a first set of adjacent ends 201, 203, 501, or 503 (referred to in general as ends 201 or 203), then drives to the next set of ends for joining and stabilizes the vehicle with automatic self-leveling outriggers 605.

As illustrated in FIG. 7A, the height H of absorber tube 115 off the ground is generally too high above ground level to be easily worked on. Thus field welding vehicle 600 may include a movable platform 610 to permit a worker to easily access to HCEs 200.

A purge gas may be provided to the interior of the HCEs 200 by flowing the gas through the aligned HCEs. Alternative, as shown in FIG. 7B as a cross-sectional view of HCEs 200 near a weld location, a traveling purge dam 700 may be used to isolate regions of collars 214a and 214b being welded. After one weld is completed, dam 700 is pulled through HCEs 200 to the next weld location.

FIGS. 6B and 7A illustrate support arms 613a and 613b positioned off of platform 610 such that a worker may support ends 201, 203 to facilitate joining the HCEs. Support arms 613a and 612b may include a cradle, or alternatively clamps, to restrain HCEs 200 near where welding is to occur, with sufficient spacing to permit access to welding equipment.

In one embodiment, a worker places adjacent HCEs in support arms 613a and 613b, and then positions welder 620 for welding. In another embodiment, welder 620 is manually placed by a worker. In another embodiment, welder 620 is supported by a "skyhook" or other devices on vehicle 600.

In many instances, variations between different HCEs 200 or the placement in supports 117 requires that adjustments be made to adjacent tubes prior to welding. Thus, for example, slight longitudinal adjustments to the position of ends 201, 203 (or 501 and 503) of adjacent HCEs 200 (or 500) may be required for welding. Longitudinal adjustments are provided by welder 620.

Figure 8A:
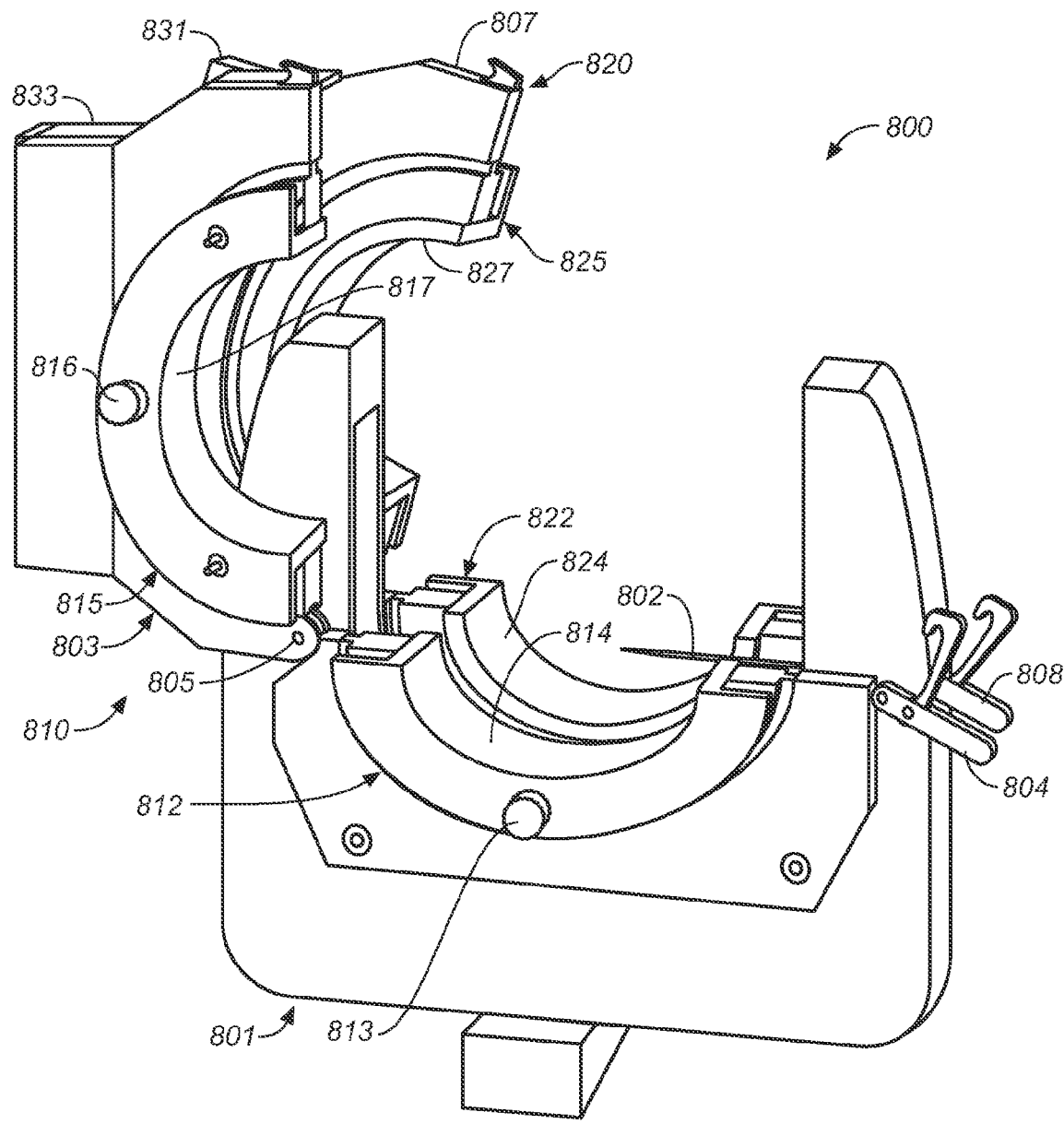
FIG. 8A is a perspective view of an embodiment of a joining apparatus.

In certain embodiments, welder 620 is a welding device that includes means for clamping the collar and longitudinally positioning the ends of accepted HCEs for proper welding. Welder 620 may thus include longitudinally adjustable clamps to accurately position collars 214 of adjacent HCEs 200 or 500. As one embodiment, which is not meant to limit the scope of the present invention, FIG. 8A is a perspective views of an embodiment of a joining apparatus 800, and FIG. 8B is an exploded perspective view of the joining apparatus. Apparatus 800 includes an adjustable left clamp 810 and an adjustable right clamp 820, which are both means for clamping the collar and longitudinally positioning the ends of accepted HCEs Joining apparatus 800 may be generally similar to welder 620, and may include a joining device, such as an orbital welder 801, an adjustable left clamp 810 and an adjustable right clamp 820. Thus, for example, adjustable left clamp 810 may be used to restrain one HCE 200, adjustable right clamp 820 may be used to restrain an adjacent HCE, and one or more of the left and right clamps may be used to position the HCEs respective collars for welding in welder 801.

In one embodiment, orbital welder 801 may have an electrode 802 that moves along a circular path during welding to weld collars 214 of ends 201, 203. Clamps 810 and 820 are adapted to restrain a pair of adjacent HCEs 200 and provide for longitudinal alignment of the HCEs for proper welding in orbital welder 801.

In another embodiment, orbital welder 801 includes a left clamp 803, a left clasp 804, and a left hinge 805, and a right clamp 807, a right clasp 808, and a right hinge 809. Adjustable left clamp 810 includes the left clamp 803, clasp 804, and hinge 805, a bottom adjustable clamping portion 812 and a top adjustable clamping portion 815. Bottom adjustable clamping portion 812 further includes a portion 812a that is attached to welder 801 and a portion 812b that moves longitudinally within portion 812a according to the action of a lead screw 813. Portion 812b presents a bottom clamping surface 814 having a seating surface 811. Top adjustable clamping portion 815 further includes a portion 815a that is attached to left clamp 803 and a portion 815b that moves longitudinally within portion 815a according to the action of a top lead screw 816. Portion 815b presents a top clamping surface 817 having a seating surface 818.

Adjustable right clamp 820, which is similar to clamp 810, includes the right clamp 807, clasp 808, and hinge 809, a bottom adjustable clamping portion 822, and a top adjustable clamping portion 825. Bottom adjustable clamping portion 822 further includes a portion 822a that is attached to welder 801 and a portion 822b that moves longitudinally within portion 822a according to the action of a lead screw 823 (which is shown FIG. 12A). Portion 822b presents a bottom clamping surface 824 having a seating surface 821. Top adjustable clamping portion 825 further includes a portion 825a that is attached to right clamp 807 and a portion 825b that moves longitudinally within portion 825a according to the action of a top lead screw 826 (shown in FIG. 12B). Portion 825b presents a top clamping surface 827 having a seating surface 828.

Bottom adjustable clamping portions 812 and 822 are thus fixed to opposite sides of welder 801, and top adjustable clamping portion 814 and 824 are affixed to clamps 803 and 807, respectively. Clamp 810 and 820 and may be held in a partially locked or fully locked position by clasp 804 and 808, respectively.

As discussed subsequently, lead screws 813, 816, 823, and 826 may turned to longitudinally move seating surfaces 811, 818, 821, and 828. Thus when left clamping surfaces 814 and 817 are closed to restrain flange 215 of one HCE 200, and right clamping surfaces 824 and 827 are closed to restrain the flange of an adjacent HCE, lead screws 813, 816, 823, and 826 may be used to adjust the location of a welding electrode 802 relative to the ends of the HCEs In certain embodiments, welder 801 and clamps 810 and 820, when closed about HCEs 200a and 200b, for an enclosure about the welding location. The enclosure may be used, for example, to provide a purge gas to the outer portion of collars 214 during welding. In one embodiment, clamps 810 and/or 820 have components that cooperate to form an enclosure when clasps 804 and 808 are secured. FIGS. 8A and 8B show an enclosure portion 831, which is attached to right clamp 810, and enclosure portion 833, which is attached to clamp 820. Enclosure portions 831 and 833 permit clamps 810 and 820 to move separately, and to form an enclosure when securing HCEs 200a and 200b. In one embodiment, portion 833 may include a transparent material, such as a glass or plastic, to permit a user to inspect the placement and/or adjustment of electrode 802 relative to ends 201 and 203 prior to welding.

Figure 9A:
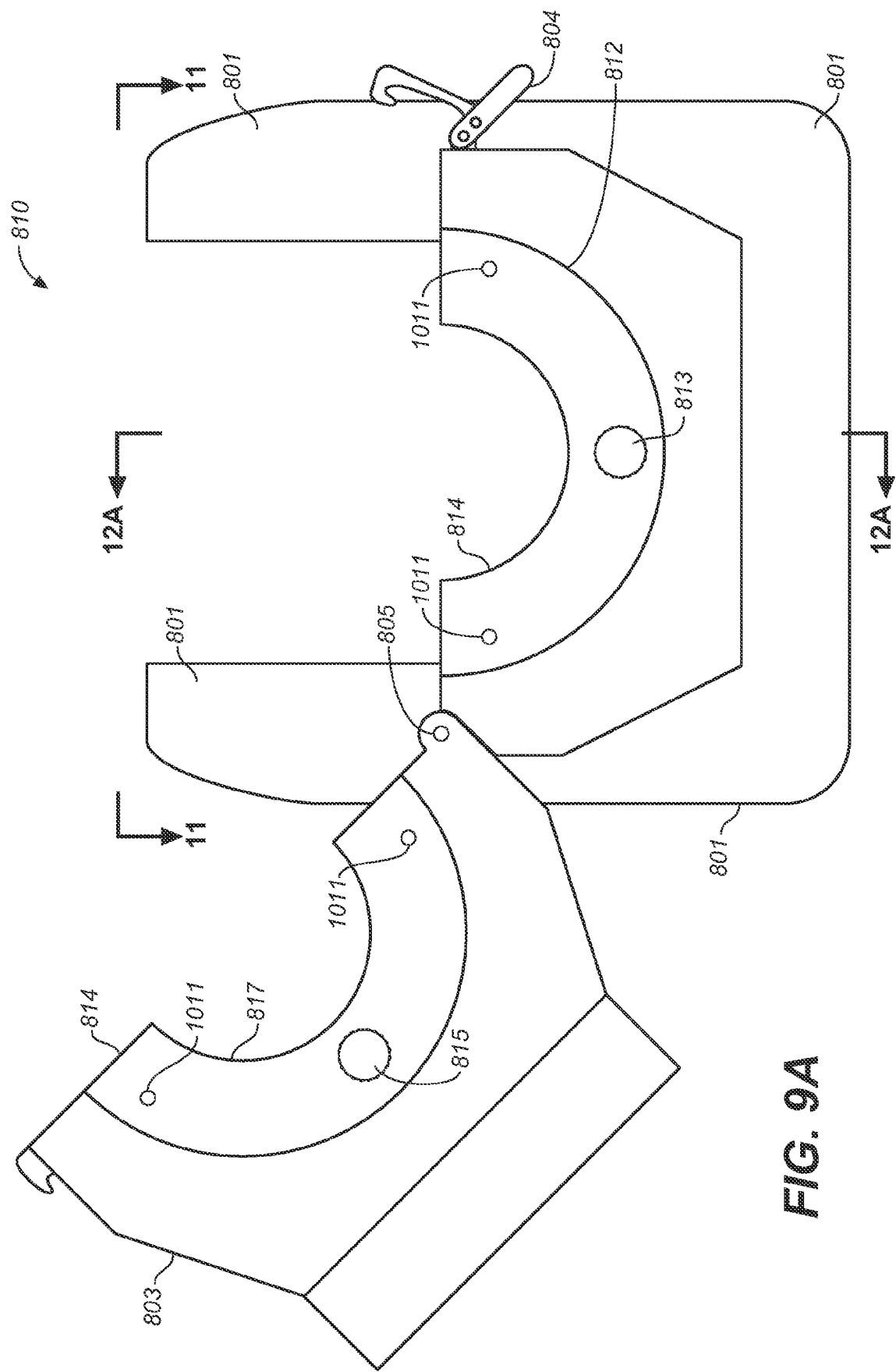
FIG. 9A is an end view of the apparatus of FIG. 8 illustrating the use of an adjustable FIG. in an open configuration.
Figure 9B:
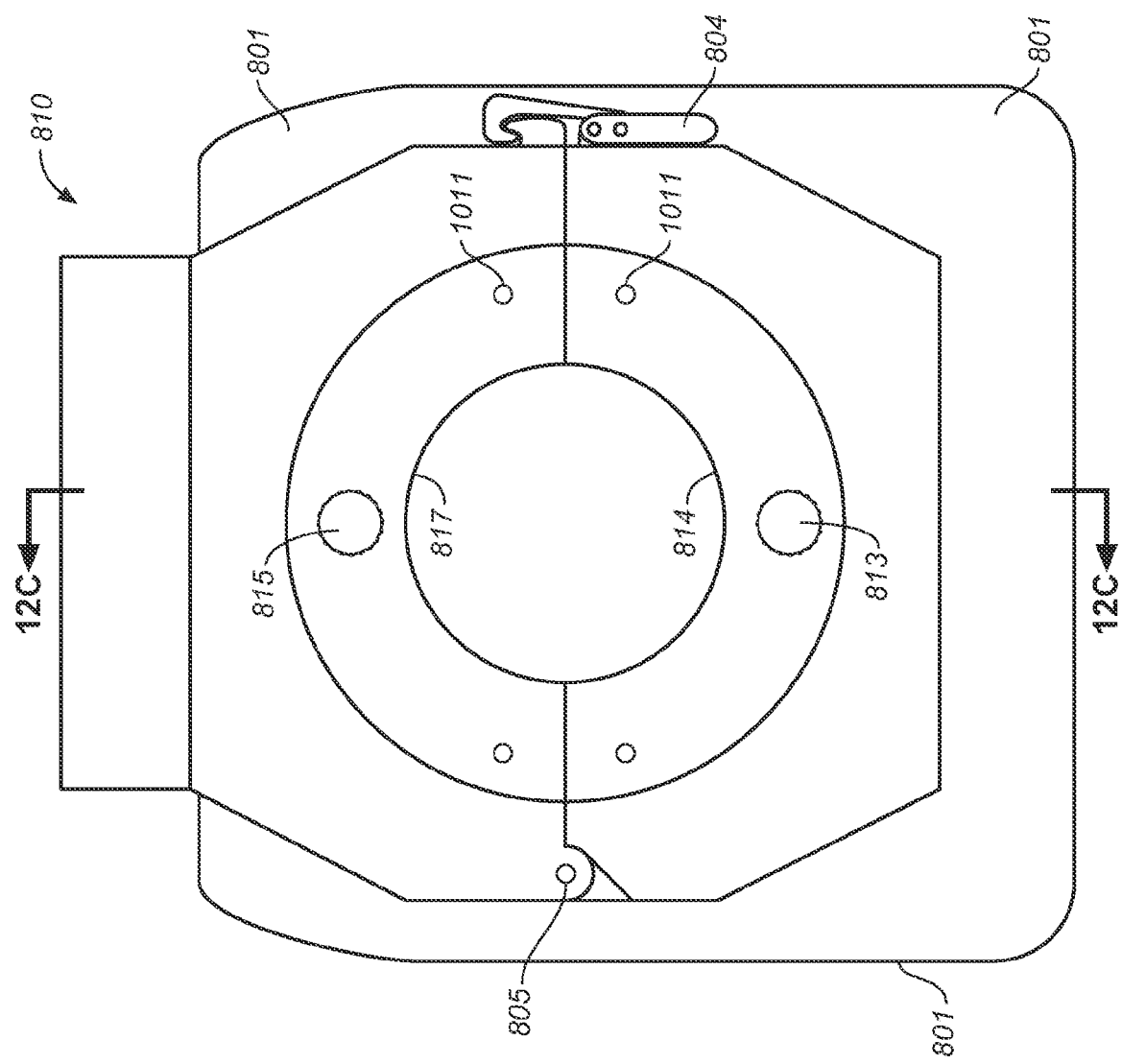
FIG. 9B is an end view of the apparatus of FIG. 8 illustrating the use of an adjustable clamp in a closed configuration.

FIGS. 9A and 9B is an end view of apparatus 800 illustrating the use of adjustable clamp 810. FIG. 9A is an open configuration, in which HCE 200 may be inserted or removed from apparatus 800. FIG. 9B is a closed configuration, in which top portion is rotated and clasped. As shown in FIG. 9B, clamping surfaces 814 and 817 form a circular clamping surface that may be used to retain a flange 215. Likewise, clamp 820 has a similar open configuration and a closed configuration in which clamping surfaces 824 and 827 may also be used to retain a flange 215. Surfaces 814, 817, 824, and 827 may be used to electrically collars 214 with respect to welder 801.

Figure 10A:
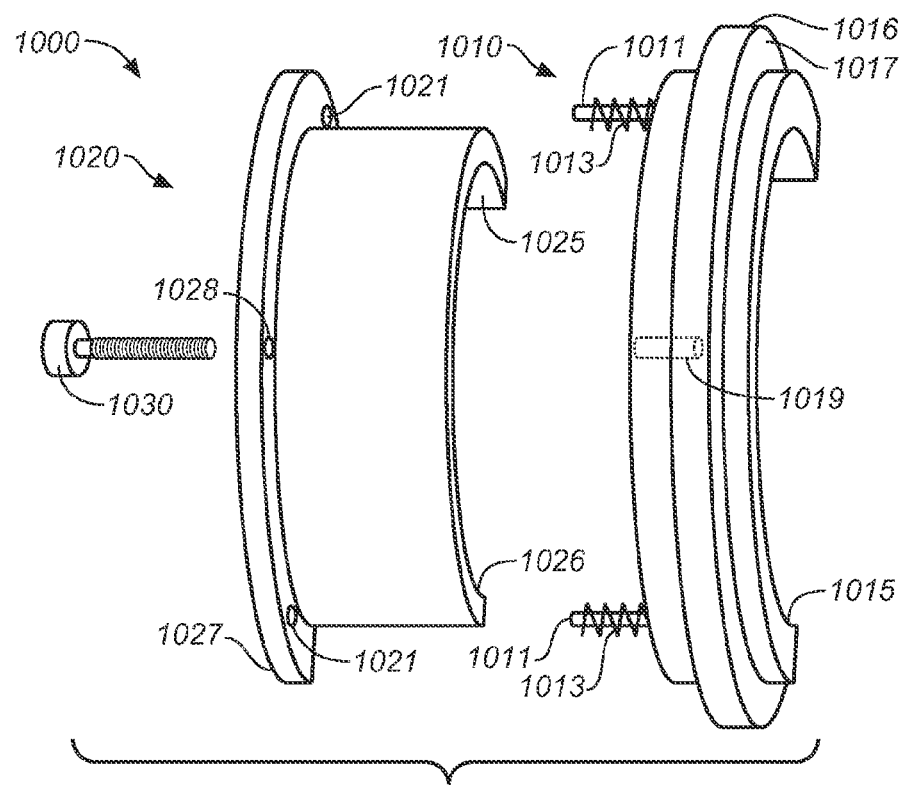
FIG. 10A as an exploded view of an adjustable clamping mechanism portion.

Adjustable clamping portions 812, 815, 822, and 815 are independently adjustable in a longitudinal direction (along the axis of an accepted HCE 200 or 500). Adjustable clamping portions 812, 815, 822, and 815 are also identical, and are illustrated in FIG. 10A as an exploded view of an adjustable clamping mechanism adjustable clamping mechanism portion 1000 and in FIG. 10B as an assembled view of the adjustable clamping mechanism.

Adjustable clamping mechanism portion 1000 includes a welder mounting plate 1010 a slidable sleeve 1020, and a lead screw 1030. Mounting plate 1010 has a welder mounting surface 1017, a sleeve guide 1015, several guide pins 1011 surrounded by springs 1013, and a treaded hole 1019. Slideable sleeve 1020 has a semicircular portion 1023 with a clamping surface 1025 having an innermost edge 1026, holes 1012 and 1028, and a surface 1027. Lead screw 1030, which may have a knurled head, passes through hole 1028 and into treaded hole 1019.

Figure 10B:
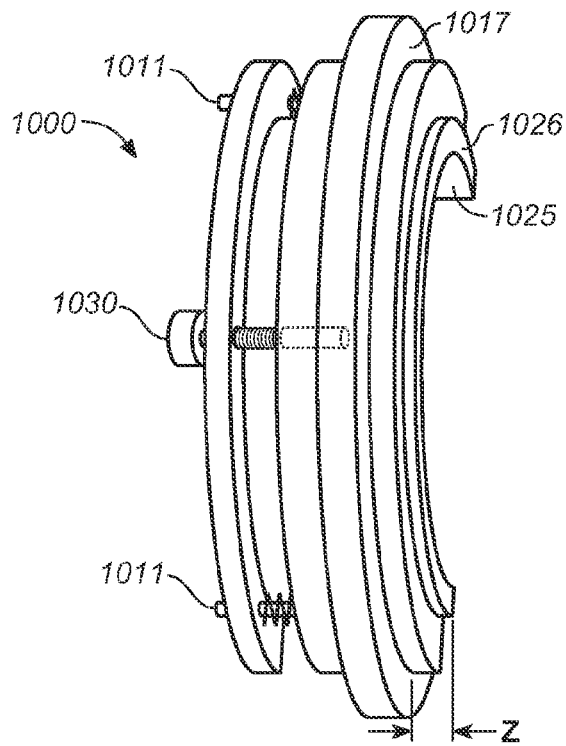
FIG. 10B as an assembled view of the adjustable clamping mechanism.

When mounting plate 1010 and sleeve 1020 are assembled, portion 1023 passes through sleeve guide 1015, pins 1011 pass through holes 1012 and springs 1013 push against mounting plate 1010 and surface 1027. As shown in FIG. 10B, the longitudinal distance between innermost edge 1026 and mounting surface 1017, Z, is adjustable by turning lead screw 1030.

With reference to FIGS. 8A, 8B, 9A 9B, 10A and 10B, adjustable clamping mechanism portion 1000 corresponds to adjustable clamping portions 812, 815, 822, and 825; mounting plate 1010 corresponds to portions 812a, 815a, 822a, and 825a, sleeve 1020 corresponds to portions 812b, 815b, 822b, and 825b, clamping surface 1025 corresponds to clamping surfaces 814, 817, 824; and 827; innermost edge 1026, corresponds to seating surfaces 811, 818, 821, and 828; lead screw 1030 corresponds to lead screws 813, 816, 823, and 826. Mounting plate 1010 may be either fixedly or removably attached to welder 801, left clamp 803 and right clamp 807 for example and without limitation, by screws, clamps, slots, pins, adhesives, welding, or any other joining method.

Figure 11:
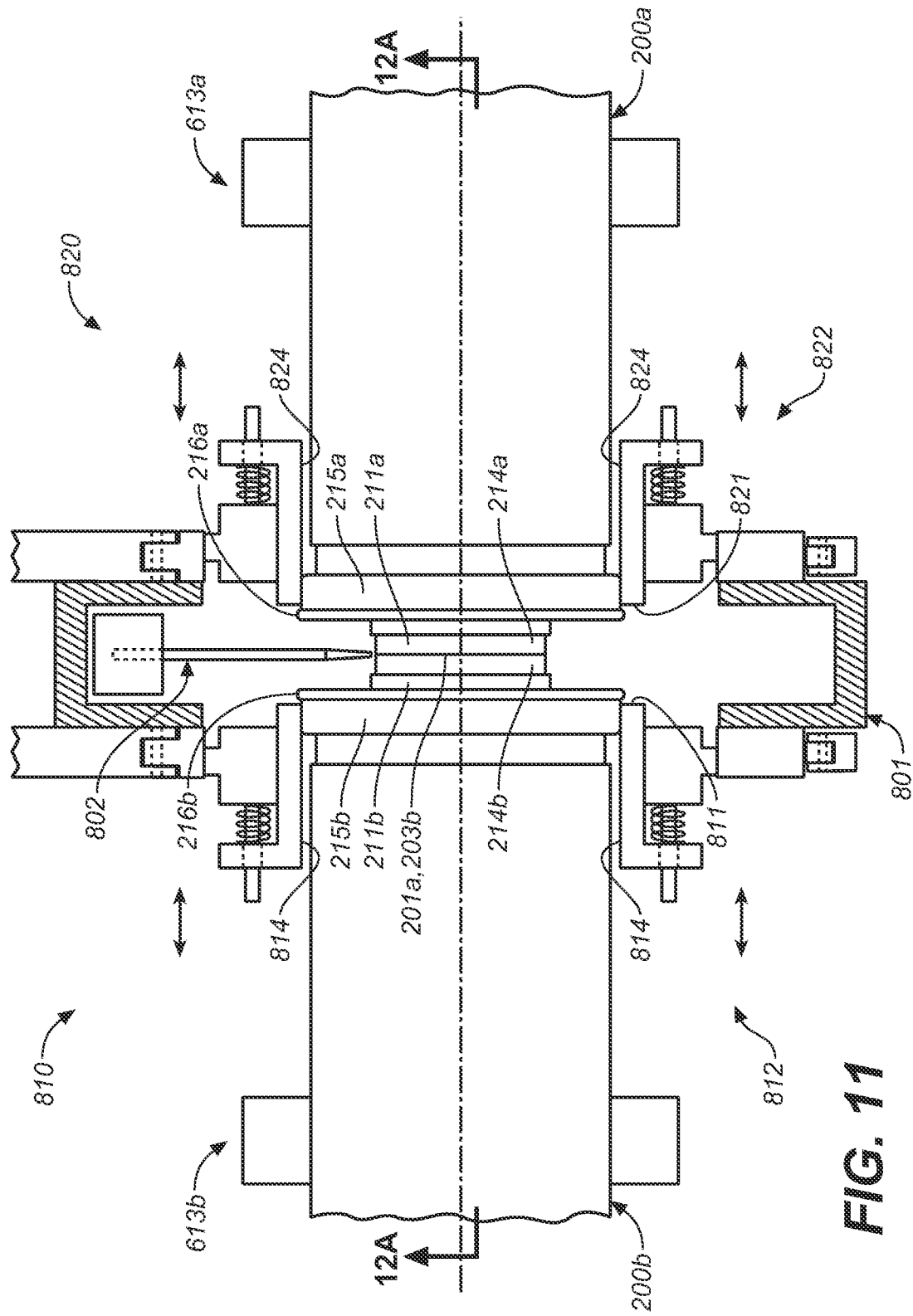
FIG. 11 is a top view 11-11 of FIG. 9A showing adjacent HCEs prior to welding within the lower part of a welding apparatus.

FIG. 11 is a top view 11-11 of FIG. 9A showing adjacent HCEs 200 prior to welding within the lower part of apparatus 800. As shown in FIG. 11, a first HCE 200a is resting in and/or supported by support arm 613a and a second HCE 200b is resting in and/or supported by support arm 613b. Flange 215a and 215b are resting against clamp surface 824 and 814, respectively, with ends 201a and 203b aligned along the centerlines of HCEs 200a and 200b, and positioned end-to-end near electrode 802 of welder 801.

Figure 12A:
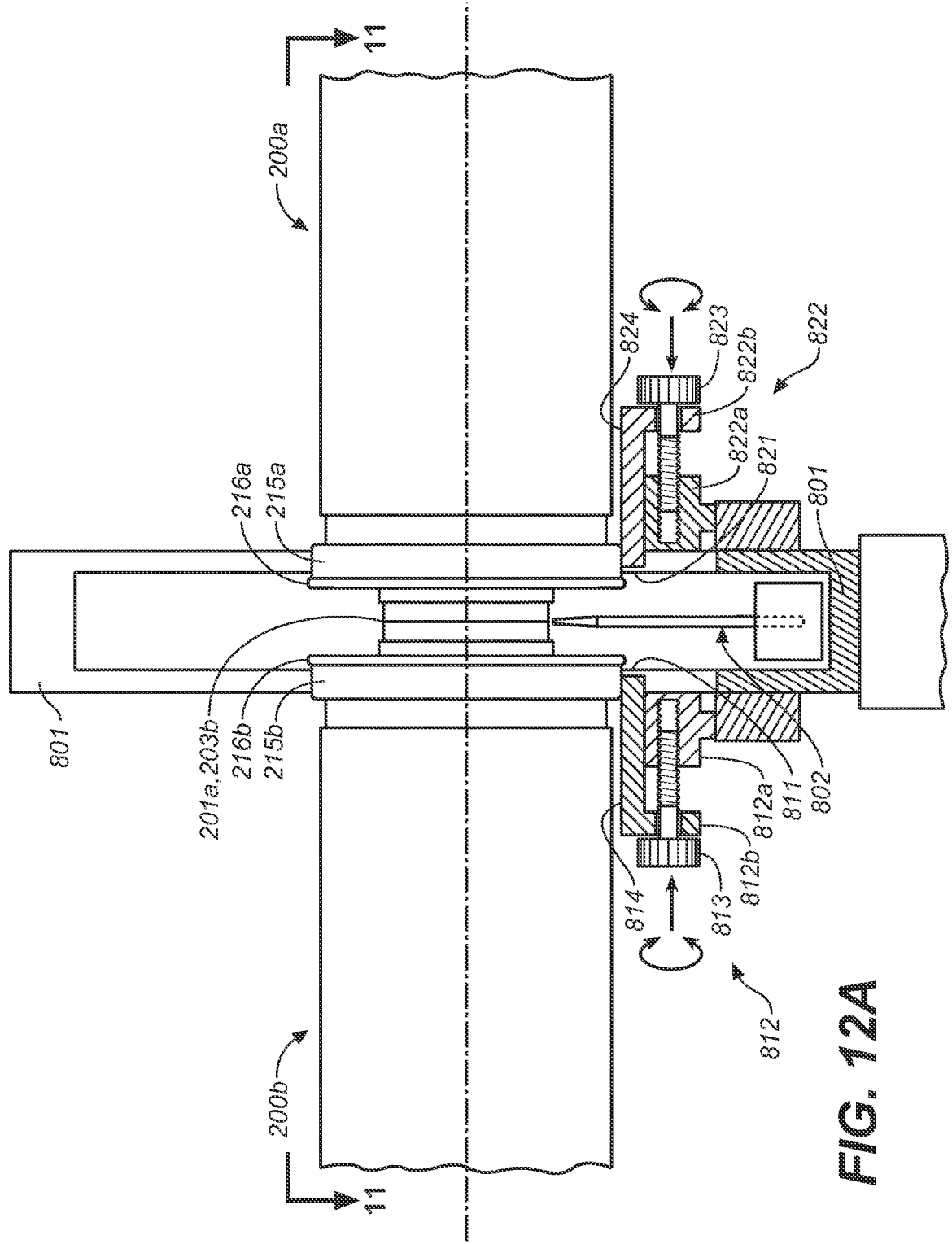

A method of aligning and welding HCEs 200a and 200b is illustrated in FIGS. 12A, 12B, 12C, and 12D, which are sequential sectional side views 12-12 from FIG. 11 illustrating one embodiment of a method of joining HCEs. As shown in FIG. 12A, HCE 200a is positioned with flange 215a on clamping surface 824 and HCE 200b is positioned with flange 215b on clamping surface 814.

As is also shown, each flange 215 has a lip 216 that slightly protrudes radially outwards from the flange. Although not a necessary part of HCE 200, lip 216 may provide a convenient feature for locating the HCE. Other techniques for locating HCE 200 within apparatus 800 may be used, including visual inspection. With electrode 802 located near ends 201a, 203b, lead screws 813 and 823 are adjusted such that lip 216a seats against seating surface 821 and lip 216b seats against seating surface 811.

FIG. 12A also illustrates the rotation of lead screws 813 and 823 to longitudinally translate portions 812b and 822b, respectively, relative to HCEs 200a and 200b. Lead screws 813 and 823 may be adjusted so that seating surfaces 811 and 821, respectively, are brought in contact with lips 216a and 216b. In addition, lead screws 813 and 823 may be adjusted to bring the tip of electrode 802 in alignment with ends 201a and 203a.

Figure 12B:
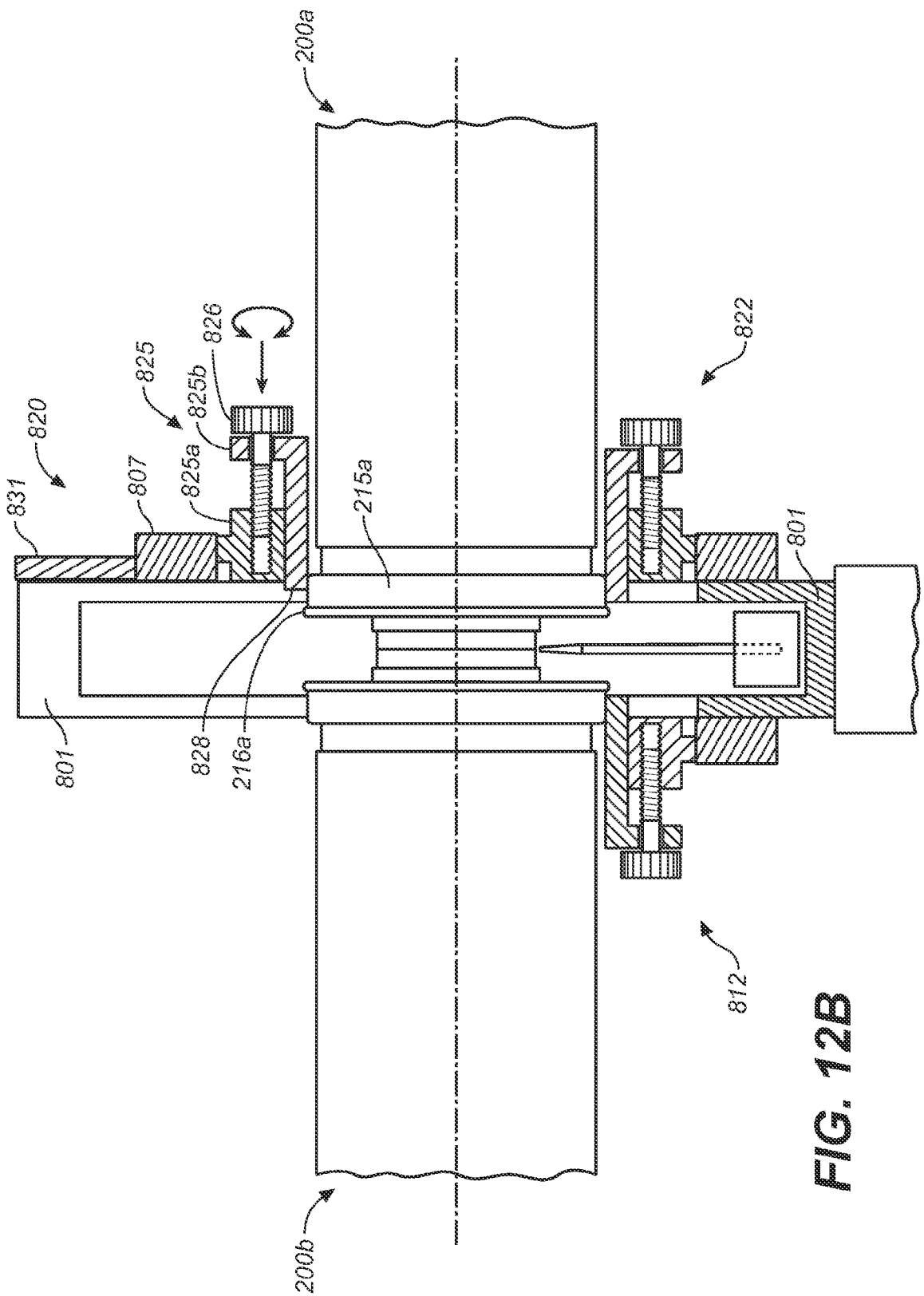

Next, as shown in FIG. 12B, the top right clamp 820 is closed by rotating right clamp 807 over flange 215a. With clasp 808 loosely tightened, lead screw 825 is adjusted such that lip 216a seats against surface 828.

Figure 12C:
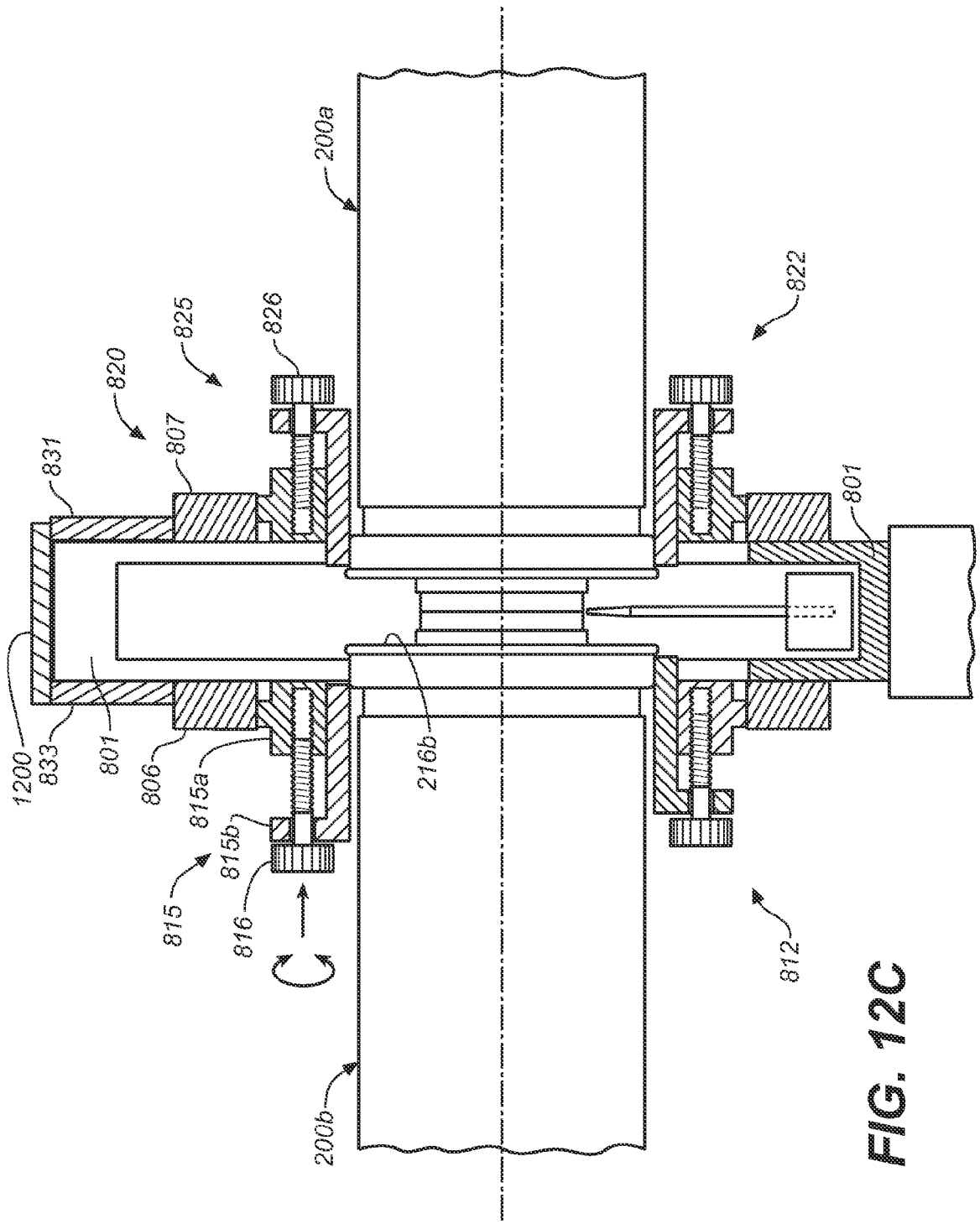

As shown in FIG. 12C, the top left clamp 810 is closed by rotating left clamp 803 over flange 215b. With clasp 804 loosely tightened, lead screw 813 is adjusted such that lip 216b seats against surface 818.

A final adjustment may now be made, as indicated in FIG. 12D. Specifically, it is important that lip 216a seats against surfaces 821 and 828, that lip 216b seats against surface 811 and 818, and that ends 201a and 203b align with the orbital motion of electrode 802. Lead screws 813, 816, 823, and 826 are rotated to achieve alignment. In one embodiment, a portion of enclosure portion 833 is a window 1200, as shown in FIG. 12D, which allows a user to view the location of electrode 802 during this adjustment. Clasps 804 and 808 are then tightened to lock apparatus 880 onto HCEs 200 between seating surfaces 814, 817, 824, and 827.

At this point, the user initiates the welding sequence, which may include providing an external purge gas within welder 801 and initiating the movement of electrode 802 about ends 201/203. When the weld in complete, the external purge gas flow is stopped, clasp 804 is released, clamp 803 is opened, and then clasp 808 is released and clamp 807 is opened, and apparatus 800 may be moved to the next weld location. In certain embodiments, portions 815b and 825b must be moved longitudinally away from each other to clear weld head 801 and permit clamps 803 and 807 to be opened.

Figure 13A:
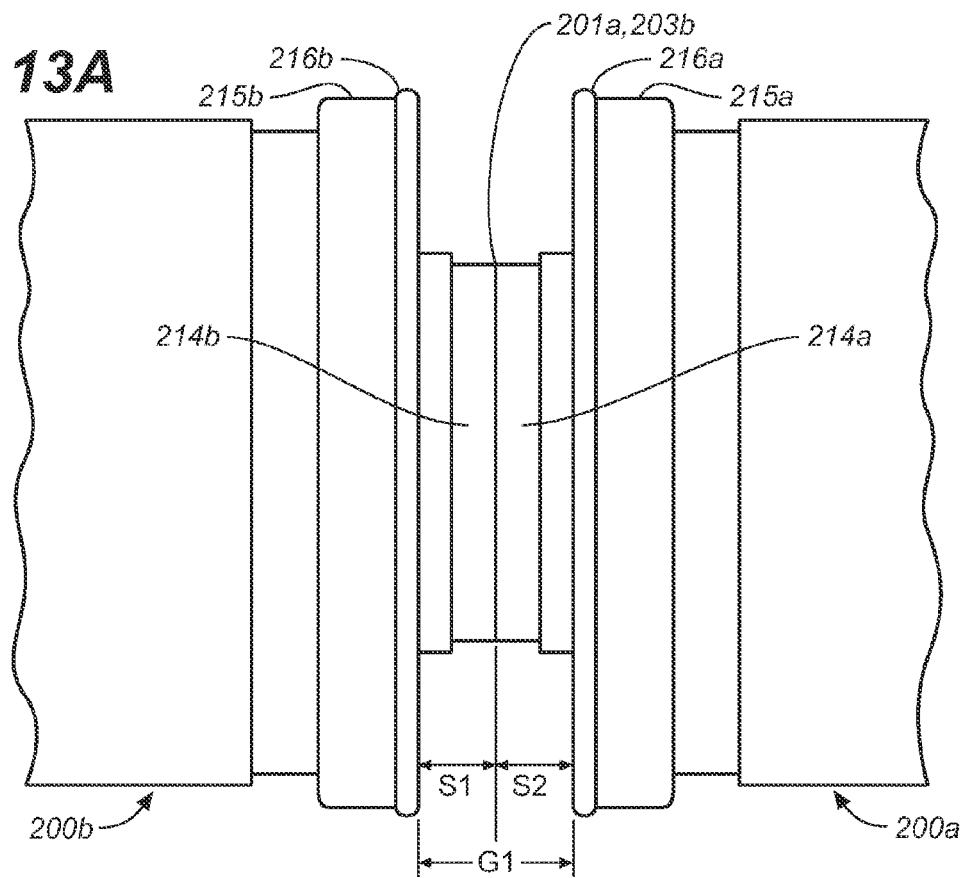
FIGS. 13A and 13B are side views different HCEs illustrating variations in HCE dimensions.
Figure 13B:
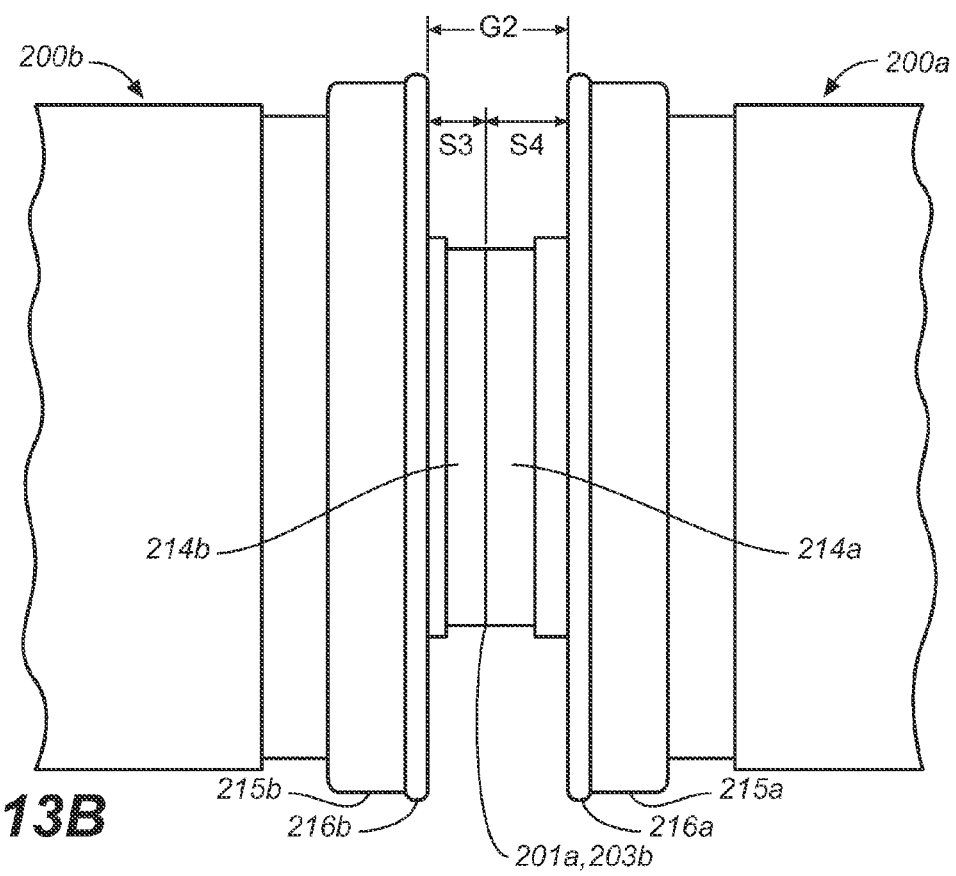

The importance of being able to make fine adjustments is highlighted in FIGS. 13A and 13B, which are side views different HCEs illustrating variations in HCE dimensions. The dimension S is the distance from an edge of flange 215, which may be lip 216, to end 201 or 203. FIG. 13A illustrates the case where the ends of adjacent HCE 200a and 200b have the same dimensions. Thus, the distance S=S1 is the same for each, and the distance between adjacent lips 216 is G1=2 S1, and the weld occurs at the midpoint of G1. Importantly, G1 is the space which a welder must fit to reach collars 214.

FIG. 13B illustrates another case, were each distance S is different (one is S1, and the other S2), the total distance between adjacent lips is G2=S2+S3, and the weld does not occurs at the midpoint, since S2 does not equal S3. Since it is important that the tip of the weld electrode be in the vicinity of end 201a/203b, and since flange 205 must be clamped for welding, it is important that both the spacing and the relative position of the HCEs and electrode be adjustable, as provided by apparatus 800.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

I claim:

1. An apparatus for welding heat collection elements (HCEs), where each HCE includes an outer tube and an inner tube, where the inner tube of each HCE has an inner diameter and at least one open end, where the outer tube of each HCE has an outer diameter that is greater than the inner diameter, said apparatus comprising:
   an orbital weld head having an electrode positioned to weld along a weld diameter that is equal to the inner diameter of the inner tube of an HCE;
   a first mechanism including a first clamping surface slidably attached to the orbital weld head, where said first clamping surface is adapted to restrain the outer diameter of the outer tube of a first HCE; and
   a second mechanism including a second clamping surface slidably attached to the orbital weld head, where said second clamping surface is adapted to restrain the outer diameter of the outer tube of a second HCE;
   where said first mechanism and said second mechanism are adjustable to translate the first clamped HCE and second clamped HCE along their respective longitudinal axis,
   such that the first HCE and the second HCE are clamped at a diameter that is greater than the weld diameter.

2. The apparatus of claim 1, where said first mechanism or said second mechanism includes a lead screw that moves a respective clamping surface relative to the weld head.

3. The apparatus of claim 1, where said first mechanism and said second mechanism are removably attached to said weld head.

4. The apparatus of claim 1, where said first mechanism and said second mechanism each includes an outer portion connected to the weld head and an inner portion including a respective clamping surface.

5. The apparatus of claim 4, where said weld head includes a first clamp and a second clamp, where said outer portion of said first mechanism is attached to the first clamp, and where said outer portion of said second mechanism is attached to said second clamp.

6. An apparatus for welding heat collection elements (HCEs), where each HCE includes an outer tube and an inner tube, where the inner tube is concentric with the outer tube, where the inner tube has an inner diameter and at least one open end, and where the outer tube has an outer diameter that is greater than the inner diameter, said apparatus comprising:
   a weld head having an electrode positioned to weld tubes along a weld diameter that is equal to the inner diameter of the inner tube of an HCE;
   a first means for clamping the outer diameter of the outer tube of a first HCE and longitudinally positioning the open end of the inner diameter of the tube of the clamped first HCE; and
   a second means for clamping the outer diameter of the outer tube of a second HCE and longitudinally positioning the open end of the inner diameter of the tube of the clamped second HCE;
   such that said first means for clamping and said second means for clamping permit abutting the inner diameter of the open ends of the first clamped HCE and the second clamped HCE, and
   such that the first HCE and the second HCE are clamped at a diameter that is greater than the weld diameter.

7. The apparatus of claim 6, where said first means for clamping includes a first clamping surface for clamping the outer diameter of the outer tube of the first HCE, where said second means for clamping includes a second clamping surface for clamping the outer diameter of the outer tube of the second HCE, and where said apparatus further includes a lead screws that longitudinally translates the first clamping surface and the second clamping surface relative to the weld head.

8. The apparatus of claim 7, where said first means for clamping and said second means for clamping each includes an outer portion connected to the weld head and an inner portion including the respective clamping surface.

9. The apparatus of claim 8, where said weld head includes a first clamp and a second clamp, where said outer portion of said first means for clamping is attached to the first clamp, and where said outer portion of said second means for clamping is attached to said second clamp.

10. The apparatus of claim 6, where at least a part of said first means for clamping is removably attached to said weld head.

11. An apparatus for welding heat collection elements (HCEs), where each HCE includes an outer tube and an inner tube, where the inner tube is concentric with the outer tube, where the inner tube has an inner diameter and at least one open end, and where the outer tube has an outer diameter that is greater than the inner diameter, said apparatus comprising:
   a first mechanism for contacting the outer diameter of the outer tube of a first HCE;
   a second mechanism for contacting the outer diameter of the outer tube of a second HCE; and
   a weld head positioned to weld at a weld diameter that is equal to the inner diameter of the first contacted HCE and second contacted HCE,
   where said first mechanism and second mechanism are attached to said weld head, and
   where at least one of said first mechanism and said second mechanism is adjustable to translate the corresponding contacted HCE in a longitudinal HCE direction,
   such that the first and second HCEs are translatable to abut the open end of the tube of the first contacted HCE and the open end of the tube of the second contacted HCE, and
   such that the first HCE and the second HCE are contacted at a diameter that is greater than the weld diameter.

12. The apparatus of claim 11, where said first mechanism includes a first clamping surface adapted to restrain the outer tube of the first HCE, and where said second mechanism includes a second clamping surface adapted to restrain the outer tube of the second HCE.

13. The apparatus of claim 12, where said at least one of said first mechanism and said second mechanism includes a lead screw that moves a respective clamping surface relative to the weld head.

14. The apparatus of claim 12, where said first mechanism and said second mechanism each includes an outer portion connected to the weld head and an inner portion including a respective clamping surface.

15. The apparatus of claim 14, where said weld head includes a first clamp and a second clamp, where said outer portion of said first mechanism is attached to the first clamp, and where said outer portion of said second mechanism is attached to said second clamp.

16. The apparatus of claim 11, where said first mechanism and said second mechanism are adapted for attachment to the weld head.

17. The apparatus of claim 11, where said weld head is an orbital weld head.

18. An apparatus for welding heat collection elements (HCEs) using a weld head having an electrode for welding at a weld diameter, where each HCE includes an outer tube and an inner tube, where the inner tube has a diameter that is the inner diameter and has at least one open end, and is concentric with the outer tube, where the outer tube has an outer diameter that is greater than the inner diameter, and where the weld diameter is equal to the inner diameter, said apparatus comprising:
- a first mechanism for accepting the outer diameter of the outer tube of a first HCE and adapted for attachment to the weld head; and
- a second mechanism for accepting the outer diameter of the outer tube of a second HCE and adapted for attachment to the weld head;
- where, when said first mechanism and said second mechanism are attached to said weld head, at least one of said first mechanism and said second mechanism is adjustable to translate the corresponding accepted HCE in a longitudinal HCE direction,
- such that the first and second HCEs are translatable to position the ends of the inner tube of the first accepted HCE and second inner tube of the second accepted HCE for welding by said weld head at the weld diameter, and
- such that the first accepted HCE and the second accepted HCE are contacted at a diameter that is greater than the weld diameter.

19. The apparatus of claim 18, where said first mechanism includes a clamping surface adapted to restraining the outer tube of the first HCE, and where said second mechanism includes a clamping surface adapted to restrain the outer tube of the second HCE.

20. The apparatus of claim 19, where said at least one of said first mechanism and said second mechanism includes a lead screw that moves a clamping surface relative to the weld head.

21. The apparatus of claim 19, where said first mechanism and said second mechanism each includes an outer portion connected to the weld head and an inner portion includes a clamping surface.

22. The apparatus of claim 21, where said weld head includes a first clamp and a second clamp, where said outer portion of said first mechanism is attached to the first clamp, and where said outer portion of said second mechanism is attached to said second clamp.

23. An apparatus for welding heat collection elements (HCEs) in a solar energy system at a height above the ground, where each HCE includes an outer tube and an inner tube, where the inner tube is concentric with the outer tube, where said inner tube has an inner diameter and at least one open end, and where the outer tube has an outer diameter that is greater than the inner diameter, said apparatus comprising:
- a vehicle including the apparatus of claim 1, a welding power supply, and a platform to enable a user to reach the HCEs for welding.

24. The apparatus of claim 23, where said vehicle includes arms for supporting HCEs for welding.

25. The apparatus of claim 23, where said vehicle includes an automatic self-leveling outrigger.

\* \* \* \* \*

UNITED STATES PATENT AND TRADEMARK OFFICE
CERTIFICATE OF CORRECTION

PATENT NO. : 8,841,573 B2
APPLICATION NO. : 12/870050
DATED : September 23, 2014
INVENTOR(S) : David Buttress Page 1 of 1

It is certified that error appears in the above-identified patent and that said Letters Patent is hereby corrected as shown below:

In the Claims

Column 10, line 6, Claim 7, the text beginning with "second HCE, and where said apparatus further includes a lead", should read -- second HCE, and where said apparatus further includes lead --

Signed and Sealed this
Tenth Day of March, 2015

Michelle K. Lee
*Deputy Director of the United States Patent and Trademark Office*